US007435292B2

(12) United States Patent
Hanmura et al.

(10) Patent No.: US 7,435,292 B2
(45) Date of Patent: Oct. 14, 2008

(54) INK COMPOSITION

(75) Inventors: Masahiro Hanmura, Kanagawa (JP); Kazuhiko Kitamura, Nagano (JP); Hiroshi Fukumoto, Nagano (JP); Toshiki Fujiwara, Kanagawa (JP); Yoshiharu Yabuki, Kanagawa (JP)

(73) Assignees: Seiko Epson Corporation, Tokyo (JP); Fuji Film Corporation, Kanagawa (JP)

( * ) Notice: Subject to any disclaimer, the term of this patent is extended or adjusted under 35 U.S.C. 154(b) by 0 days.

(21) Appl. No.: 10/573,798

(22) PCT Filed: Sep. 30, 2004

(86) PCT No.: PCT/JP2004/014351

§ 371 (c)(1), (2), (4) Date: Dec. 15, 2006

(87) PCT Pub. No.: WO2005/030887

PCT Pub. Date: Apr. 7, 2005

(65) Prior Publication Data

US 2007/0146453 A1 Jun. 28, 2007

(30) Foreign Application Priority Data

Sep. 30, 2003 (JP) ............................ 2003-339688

(51) Int. Cl.
*C09D 11/00* (2006.01)
*C09D 11/02* (2006.01)
*B41J 2/01* (2006.01)

(52) U.S. Cl. .................. 106/31.48; 106/31.58; 347/100

(58) Field of Classification Search ............. 106/31.48, 106/31.58; 347/100
See application file for complete search history.

(56) References Cited

U.S. PATENT DOCUMENTS 6,984,032 B2 * 1/2006 Kitamura et al. ............ 347/100
7,083,669 B2 * 8/2006 Fukumoto et al. ........ 106/31.49
7,211,132 B2 * 5/2007 Oki et al. ................. 106/31.47
2005/0115459 A1 * 6/2005 Hanmura et al. ......... 106/31.47

FOREIGN PATENT DOCUMENTS

| | | |
|---|---|---|
| JP | 10-152635 | 6/1998 |
| JP | 2000-289322 | 10/2000 |
| JP | 2000-290559 | 10/2000 |
| JP | 2001-288392 | 10/2001 |
| JP | 2002-371079 | 12/2002 |
| JP | 2002-371214 | 12/2002 |
| JP | 2003-231845 | 8/2003 |
| JP | 2003-246942 | 9/2003 |

OTHER PUBLICATIONS

English translation of JP 2003/246942; Sep. 2003.*

* cited by examiner

*Primary Examiner*—Helene Klemanski
(74) *Attorney, Agent, or Firm*—Ladas and Parry LLP

(57) ABSTRACT

An ink composition containing at least water, at least one member selected from a compound represented by formula (1) shown below and a salt thereof, and at least one member selected from an aromatic compound having a carboxyl group and a salt thereof:

Formula (1):

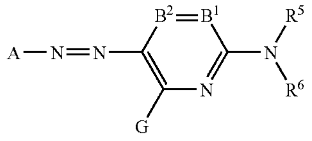

In formula (1), A represents a residue of a 5-membered heterocyclic diazo component A-$NH_2$; $B^1$ and $B^2$ each represents —$CR^1$= or —$CR^2$=, or either one of $B^1$ and $B^2$ represents a nitrogen atom and the other represents —$CR^1$= or —$CR^2$=; $R^5$ and $R^6$ each independently represents a hydrogen atom, an aliphatic group, an aromatic group, a heterocyclic group or the like; and G, $R^1$ and $R^2$ each independently represents a hydrogen atom, a halogen atom, an aliphatic group, an aromatic group, a heterocyclic group or the like.

10 Claims, No Drawings

INK COMPOSITION

TECHNICAL FIELD

The present invention relates to an ink composition suitable for inkjet recording, particularly, an ink composition compatibly having all of light fastness, gas fastness and moisture resistance, and also relates to an inkjet recording method using the ink composition and recorded matter which is recorded by the recording method.

BACKGROUND ART

An inkjet recording method is recently attracting attention. The inkjet recording method is a printing method of flying an ink composition in the form of small droplets and attaching it onto a recording medium such as paper, thereby performing the printing. This method is characterized in that a high-resolution and high-quality image can be printed at a high speed by using a relatively inexpensive apparatus. An inkjet recording apparatus utilizing this method is commercially accepted over a wide range by virtue of its print quality, low cost, relatively quiet operation and graphics capability. In particular, thermal (Bubblejet®) and piezoelectric drop-on-demand printers have succeeded on the market and have been widely used as a printer for personal computers in offices and homes.

In recent years, formation of a color image by inkjet recording is implemented by preparing a plurality of color ink compositions. In the formation of a color image, three colors of a yellow ink composition, a magenta ink composition and a cyan ink composition are generally used and depending on the case, four colors with the addition of a black ink composition are used. Furthermore, a color image is sometimes formed with six colors by adding a light cyan ink composition and a light magenta ink composition to the above-described four colors or with seven colors by further adding a dark yellow ink composition. The ink composition used for such formation of a color image is required not only to have good colorability by itself but also, for example, to produce a good intermediate color when combined with a plurality of ink compositions or cause no discoloration or fading of the printed matter during subsequent storage.

Also, by virtue of continuous improvements in respective fields of head, ink composition, recording method and media, the recent "photographic image quality" printing by a color inkjet printer has reached a level comparable to a "silver salt photography", and the image quality has reached a "photographic quality". Meanwhile, attempts to achieve characteristic enhancement by improving the ink composition and media are also being made on the preservability of the obtained image. Particularly, as for the light fastness, the characteristic enhancement to a level of causing no problem in practice has been achieved (see Patent Documents 1 and 2). However, the level is still not on a par with silver salt photography. In the standard evaluation of light fastness ability, the fading rate of each pure color pattern (optical density close to 1.0) of yellow, magenta and cyan is used as an index for the judgement. When the light fastness ability of the ink composition loaded in a printer currently available on the market is judged by this evaluation method, the ability of the magenta ink composition is lowest and in many cases, determines the light fastness life of an ink set. The improvement of light fastness of the magenta ink composition leads to enhancement of the light fastness of a photographic image and extension of the light fastness life of an ink set.

The printed matter prepared by using the above-described ink composition is disposed not only of course indoors but also sometimes outdoors and exposed to various lights (including sunlight) and outside airs (e.g., ozone, nitrogen oxide, sulfur oxide), and attempts are being made to develop an ink composition excellent in the fastness to light and gas. The properties such as light fastness and gas fastness are greatly governed by the coloring material in the ink, and development of a magenta ink composition excellent also in the moisture resistance in addition to these properties is being demanded.

Azo compounds described in Patent Documents 3 and 4 have been proposed as a colorant excellent in the light fastness and gas fastness.

Patent Document 1: JP 2000-290559 A

Patent Document 2: JP 2001-288392 A

Patent Document 3: JP 2002-371214 A

Patent Document 4: JP 2002-371079 A

DISCLOSURE OF THE INVENTION

Problems to be Solved by the Invention

An object of the present invention is to solve the above-described problems and provide an ink composition having high reliability in terms of clogging or the like and compatibly having all of light fastness, gas fastness and moisture resistance, an inkjet recording method using the ink composition, and recorded matter.

MEANS TO SOLVE THE PROBLEMS

The present inventors have continuously made studies and investigations on the clogging resistance, light fastness, gas fastness and moisture resistance of various magenta dyes, as a result, it has been found that when an aromatic compound having a carboxyl group and/or a salt thereof is added to an ink composition containing a specific magenta dye, all of those properties are compatibly attained and further that when the salt of the compound having a carboxyl group added is a lithium salt, remarkably excellent effect of improving the clogging resistance is obtained. The present invention has been accomplished based on these findings.

1. The ink composition according to the present invention is characterized by comprising at least water, at least one member selected from a compound represented by formula (1) shown below and a salt thereof, and at least one member selected from an aromatic compound having a carboxyl group and a salt thereof:

Formula (1):

[Chem. 3]

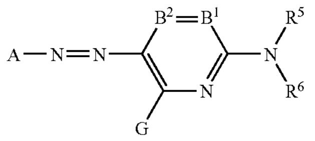

wherein A represents a residue of a 5-membered heterocyclic diazo component $A\text{-}NH_2$; $B^1$ and $B^2$ each represents $—CR^1=$ or $—CR^2=$, or either one of $B^1$ and $B^2$ represents a nitrogen atom and the other represents $—CR^1=$ or $—CR^2=$; $R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent; G, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted by an alkyl, aryl or heterocyclic group, an acylamino group, a ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, an alkylsulfonyl group, an arylsulfonyl group, an alkylsulfinyl group, an arylsulfinyl group, a sulfamoyl group, a sulfo group or a heterocyclic thio group, and each group may be further substituted; and $R^1$ and $R^5$, or $R^5$ and $R^6$ may combine to form a 5- or 6-membered ring.

2. The ink composition according to the present invention is characterized in that the compound represented by formula (1) or a salt thereof is a compound represented by the following formula (2) or a salt thereof:

Formula (2):

[Chem. 4]

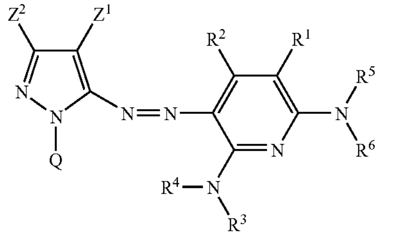

wherein $Z^1$ represents an electron-withdrawing group having a Hammett's substituent constant σp value of 0.20 or more; $Z^2$ represents a hydrogen atom, an aliphatic group, an aromatic group or a heterocyclic group; $R^1$, $R^2$, $R^5$ and $R^6$ have the same meanings as in formula (1); $R^3$ and $R^4$ each independently represents a hydrogen atom, an aliphatic group, an aromatic group, a heterocyclic group, an acyl group, an alkoxycarbonyl group, an aryloxycarbonyl group, a carbamoyl group, a sulfonyl group or a sulfamoyl group; Q represents a hydrogen atom, an aliphatic group, an aromatic group or a heterocyclic group; and the groups represented by $Z^1$, $Z^2$, $R^1$ to $R^6$ and Q may each further have a substituent.

3. The ink composition according to the present invention is characterized in that the content ratio of the at least one member selected from a compound represented by formula (1) and a salt thereof and the at least one member selected from an aromatic compound having a carboxyl group and a salt thereof is from 4:1 to 1:10 in terms of the weight ratio of respective total amounts.

4. The ink composition according to the present invention is characterized in that the aromatic compound having a carboxyl group or a salt thereof as described in any one of 1 to 3 above is a compound having a naphthalene skeleton or a salt thereof.

5. The ink composition according to the present invention is characterized in that the compound having a naphthalene skeleton or a salt thereof as described in 4 above is a compound having a carboxyl group at its 2-position or a salt thereof.

6. The ink composition according to the present invention is characterized in that the compound having a carboxyl group at its 2-position and having a naphthalene skeleton or a salt thereof as described in 5 above is a 2-naphthoic acid, a 3-hydroxy-2-naphthoic acid, a 6-hydroxy-2-naphthoic acid, a 6-methoxy-2-naphthoic acid, or a salt thereof.

7. The ink composition according to the present invention is characterized in that the salt of the aromatic compound having a carboxyl group as described in any one of 4 to 6 above is a lithium salt.

8. The ink composition according to the present invention is characterized by being used in an inkjet recording method.

9. The ink composition according to the present invention is characterized in that the inkjet recording method is a recording method using an inkjet head which forms an ink droplet by mechanical deformation of an electrostrictive element.

10. The inkjet recording method according to the present invention is an inkjet recording method of ejecting a liquid droplet of an ink composition, and attaching the liquid droplet onto a recording medium, thereby performing the recording, and is characterized in that the ink composition described in any one of 1 to 9 above is used as the ink composition.

11. The recorded matter according to the present invention is recorded with the ink composition described in any one of 1 to 9 above or by the recording method described in 10 above.

According to the ink composition of the present invention and the recording method using the composition, high reliability of clogging resistance which is essential for the inkjet recording system can be ensured and recorded matter excellent in moisture resistance as well as in light fastness and gas fastness (ozone fastness) can be provided.

BEST MODE FOR CARRYING OUT THE INVENTION

The ink composition of the present invention essentially comprises at least one magenta colorant selected from compounds represented by formula (1) (including a salt thereof, hereinafter this compound is referred to without a salt thereof) and at least one member selected from an aromatic compound having a carboxyl group and a salt thereof in an aqueous medium comprising water or comprising water and a water-soluble organic solvent, and as needed, may further contain a humectant, a viscosity adjusting agent, a pH adjusting agent and other additives.

The compound represented by formula (1) for use in the ink composition of the present invention has an effect of improving light fastness and gas fastness, and one kind of the compound may be used alone or a plural kind of the compounds may be used in combination.

The compound represented by formula (1) which is usable in the present invention is described below.

In formula (1), A represents a residue of a 5-membered heterocyclic diazo component $A-NH_2$. Examples of the heteroatom in the 5-membered heterocyclic ring include N, O and S. The heterocyclic ring is preferably a nitrogen-containing 5-membered heterocyclic ring, and an aliphatic ring, an aromatic ring or another heterocyclic ring may be condensed to the heterocyclic ring. Preferred examples of the heterocyclic ring of A include a pyrazole ring, an imidazole ring, a thiazole ring, an isothiazole ring, a thiadiazole ring, a benzothiazole ring, a benzoxazole ring and a benzisothiazole ring. Each heterocyclic group may further have a substituent. Among these heterocyclic rings, more preferred are a pyrazole ring, an imidazole ring, an isothiazole ring, a thiadiazole ring and a benzothiazole ring represented by the following formulae (a) to (f):

[Chem. 5]

Formula (a)

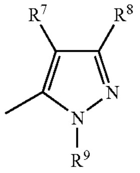

(b)

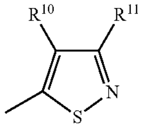

(c)

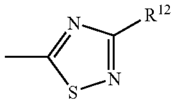

(d)

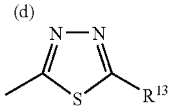

(e)

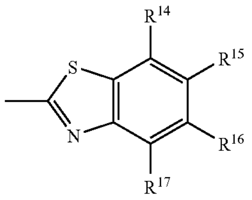

(f)

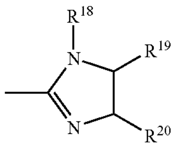

In formulae (a) to (f), $R^7$ to $R^{20}$ each represents the same substituent as G, $R^1$ and $R^2$ which are described later. Among formulae (a) to (f), preferred are a pyrazole ring and an isothiazole ring represented by formulae (a) and (b), and most preferred is a pyrazole ring represented by formula (a).

$B^1$ and $B^2$ each represents —$CR^1$= or —$CR^2$=, or either one of $B^1$ and $B^2$ represents a nitrogen atom and the other represents —$CR^1$= or —$CR^2$=. $B^1$ and $B^2$ each preferably represents —$CR^1$=, or —$CR^2$=.

$R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent. The substituents represented by $R^5$ and $R^6$ each is preferably a hydrogen atom, an aliphatic group, an aromatic group, a heterocyclic group, an acyl group, an alkylsulfonyl group or an arylsulfonyl group, more preferably a hydrogen atom, an aromatic group, a heterocyclic group, an acyl group, an alkylsulfonyl group or an arylsulfonyl group, and most preferably a hydrogen atom, an aryl group or a heterocyclic group, and each group may further have a substituent, but $R^5$ and $R^6$ are not a hydrogen atom at the same time.

G, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted by an alkyl, aryl or heterocyclic group, an acylamino group, a ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, a heterocyclic thio group, an alkylsulfonyl group, an arylsulfonyl group, an alkylsulfinyl group, an arylsulfinyl group, a sulfamoyl group or a sulfo group, and each group may be further substituted.

The substituent represented by G is preferably a hydrogen atom, a halogen atom, an aliphatic group, an aromatic group, a hydroxy group, an alkoxy group, an aryloxy group, an acyloxy group, a heterocyclic oxy group, an amino group substituted by an alkyl, aryl or heterocyclic group, an acylamino group, a ureido group, a sulfamoylamino group, an alkoxycarbonylamino group, an aryloxycarbonylamino group, an alkylthio group, an arylthio group or a heterocyclic thio group, more preferably a hydrogen atom, a halogen atom, an alkyl group, a hydroxy group, an alkoxy group, an aryloxy group, an acyloxy group, an amino group substituted by an alkyl, aryl or heterocyclic group, or an acylamino group, and most preferably a hydrogen atom, an arylamino group or an amido group, and each group may further have a substituent.

The substituents represented by $R^1$ and $R^2$ each is preferably a hydrogen atom, an alkyl group, an alkoxy-carbonyl group, a carboxyl group, a carbamoyl group or a cyano group, and each group may further have a substituent. $R^1$ and $R^5$, or $R^5$ and $R^6$ may combine to form a 5- or 6-membered ring. When the substituents represented by A, $R^1$, $R^2$, $R^5$, $R^6$ and G each further has a substituent, examples of the substituent include the substituents described above for G, $R^1$ and $R^2$.

In the case where the azo dye represented by formula (1) is a water-soluble dye, the dye preferably further has an ionic hydrophilic group as a substituent on any position of A, $R^1$, $R^2$, $R^5$, $R^6$ and G. Examples of the ionic hydrophilic group as a substituent include a sulfo group, a carboxyl group and a quaternary ammonium group. Among these ionic hydrophilic groups, preferred are a carboxyl group and a sulfo group, more preferred is a sulfo group. The carboxyl group and the sulfo group each may be in the salt state, and examples of the counter ion for forming the salt include an alkali metal ion (e.g., sodium ion, potassium ion, lithium ion), ammonium ion and an organic cation (e.g., tetramethylammonium ion, tetramethylguanidium ion).

The substituents represented by G, $R^1$ and $R^2$ are described in detail below.

The halogen atom includes a fluorine atom, a chlorine atom and a bromine atom.

The aliphatic group as used in the present invention means an alkyl group, a substituted alkyl group, an alkenyl group, a substituted alkenyl group, an alkynyl group, a substituted alkynyl group, an aralkyl group and a substituted aralkyl group. The aliphatic group may be branched or may form a ring. The number of carbon atoms in the aliphatic group is preferably from 1 to 20, more preferably from 1 to 16. The aryl moiety in the aralkyl group and the substituted aralkyl group is preferably phenyl or naphthyl, more preferably phenyl. Examples of the aliphatic group include a methyl group, an ethyl group, a butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, a cyclohexyl group, a benzyl group, a 2-phenethyl group, a vinyl group and an allyl group.

The aromatic group as used in the present invention means an aryl group and a substituted aryl group. The aryl group is preferably phenyl or naphthyl, more preferably phenyl. The number of carbon atoms in the aromatic group is preferably from 6 to 20, more preferably from 6 to 16. Examples of the aromatic group include phenyl, p-tolyl, p-methoxyphenyl, o-chlorophenyl and m-(3-sulfopropylamino)-phenyl. The heterocyclic group includes a heterocyclic group having a substituent, and an unsubstituted heterocyclic group. An aliphatic ring, an aromatic ring or another heterocyclic ring may be condensed to the heterocyclic ring. The heterocyclic group is preferably a 5- or 6-membered heterocyclic group. Examples of the substituent include an aliphatic group, a halogen atom, an alkylsulfonyl group, an arylsulfonyl group, an acyl group, an acylamino group, a sulfamoyl group, a carbamoyl group and an ionic hydrophilic group. Examples of the heterocyclic group include a 2-pyridyl group, a 2-thienyl group, a 2-thiazolyl group, a 2-benzothiazolyl group, a 2-benzoxazolyl group and a 2-furyl group.

The carbamoyl group includes a carbamoyl group having a substituent, and an unsubstituted carbamoyl group. Examples of the substituent therefor include an alkyl group. Examples of the carbamoyl group include a methylcarbamoyl group and a dimethylcarbamoyl group.

The alkoxycarbonyl group includes an alkoxycarbonyl group having a substituent, and an unsubstituted alkoxycarbonyl group. The alkoxycarbonyl group is preferably an alkoxycarbonyl group having from 2 to 12 carbon atoms. Examples of the substituent include an ionic hydrophilic group. Examples of the alkoxycarbonyl group include a methoxycarbonyl group and an ethoxycarbonyl group.

The aryloxycarbonyl group includes an aryloxycarbonyl group having a substituted, and an unsubstituted aryloxycarbonyl group. The aryloxycarbonyl group is preferably an aryloxycarbonyl group having from 7 to 12 carbon atoms. Examples of the substituent include an ionic hydrophilic group. Examples of the aryloxycarbonyl group include a phenoxycarbonyl group.

The acyl group includes an acyl group having a substituent, and an unsubstituted acyl group. The acyl group is preferably an acyl group having from 1 to 12 carbon atoms. Examples of the substituent include an ionic hydrophilic group. Examples of the acyl group include an acetyl group and a benzoyl group.

The alkoxy group includes an alkoxy group having a substituent, and an unsubstituted alkoxy group. The alkoxy group is preferably an alkoxy group having from 1 to 12 carbon atoms. Examples of the substituent include an alkoxy group, a hydroxyl group and an ionic hydrophilic group. Examples of the alkoxy group include a methoxy group, an ethoxy group, an isopropoxy group, a methoxyethoxy group, a hydroxyethoxy group and a 3-carboxypropoxy group.

The aryloxy group includes an aryloxy group having a substituent, and an unsubstituted aryloxy group. The aryloxy group is preferably an aryloxy group having from 6 to 12 carbon atoms. Examples of the substituent include an alkoxy group and an ionic hydrophilic group. Examples of the aryloxy group include a phenoxy group, a p-methoxyphenoxy group and an o-methoxyphenoxy group.

The acyloxy group includes an acyloxy group having a substituent, and an unsubstituted acyloxy group. The acyloxy group is preferably an acyloxy group having from 1 to 12 carbon atoms. Examples of the substituent include an ionic hydrophilic group. Examples of the acyloxy group include an acetoxy group and a benzoyloxy group.

The carbamoyloxy group includes a carbamoyloxy group having a substituent, and an unsubstituted carbamoyloxy group. Examples of the substituent include an alkyl group. Examples of the carbamoyloxy group include an N-methylcarbamoyloxy group.

The amino group substituted by an alkyl, aryl or heterocyclic group may further have a substituent. An unsubstituted amino group is not included in this amino group. The alkylamino group is preferably an alkylamino group having from 1 to 6 carbon atoms. Examples of the substituent include an ionic hydrophilic group. Examples of the alkylamino group include a methylamino group and a diethylamino group. The arylamino group includes an arylamino group having a substituent, and an unsubstituted arylamino group. The arylamino group is preferably an arylamino group having from 6 to 12 carbon atoms. Examples of the substituent include a halogen atom and an ionic hydrophilic group. Examples of the arylamino group include an anilino group and a 2-chloroanilino group.

The acylamino group includes an acylamino group having a substituent. The acylamino group is preferably an acylamino group having from 2 to 12 carbon atoms. Examples of the substituent include an ionic hydrophilic group. Examples of the acylamino group include an acetylamino group, a propionylamino group, a benzoylamino group, an N-phenylacetylamino group and a 3,5-disulfobenzoylamino group.

The ureido group includes a ureido group having a substituent, and an unsubstituted ureido group. The ureido group is preferably a ureido group having from 1 to 12 carbon atoms. Examples of the substituent include an alkyl group and an aryl group. Examples of the ureido group include a 3-methylureido group, a 3,3-dimethylureido group and a 3-phenylureido group.

The sulfamoylamino group includes a sulfamoylamino group having a substituent, and an unsubstituted sulfamoylamino group. Examples of the substituent include an alkyl group. Examples of the sulfamoylamino group include an N,N-dipropylsulfamoylamino group.

The alkoxycarbonylamino group includes an alkoxycarbonylamino group having a substituent, and an unsubstituted alkoxycarbonylamino group. The alkoxycarbonylamino group is preferably an alkoxycarbonylamino group having from 2 to 12 carbon atoms. Examples of the substituent include an ionic hydrophilic group. Examples of the alkoxycarbonylamino group include an ethoxycarbonylamino group.

The aryloxycarbonylamino group includes an aryloxycarbonylamino group having a substituent, and an unsubstituted aryloxycarbonylamino group. The aryloxycarbonylamino group is preferably an aryloxycarbonylamino group having from 7 to 12 carbon atoms. Examples of the substituent include an ionic hydrophilic group. Examples of the aryloxycarbonylamino group include a phenoxycarbonylamino group.

The alkyl- or aryl-sulfonylamino group includes an alkyl- or aryl-sulfonylamino group having a substituent, and an unsubstituted alkyl- or aryl-sulfonylamino group. The sulfonylamino group is preferably a sulfonylamino group having from 1 to 12 carbon atoms. Examples of the substituent include an ionic hydrophilic group. Examples of the sulfonylamino group include a methanesufonylamino group, an N-phenylmethanesulfonylamino group, a benzenesulfonylamino group and a 3-carboxybenzenesulfonylamino group.

The alkyl-, aryl- or heterocyclic-thio group includes an alkyl-, aryl- or heterocyclic-thio group having a substituent and an unsubstituted alkyl-, aryl- or heterocyclic-thio group. The alkyl-, aryl- or heterocyclic-thio group is preferably an alkyl-, aryl- or heterocyclic-thio group having from 1 to 12 carbon atoms. Examples of the substituent include an ionic hydrophilic group. Examples of the alkyl-, aryl- or heterocyclic-thio group include a methylthio group, a phenylthio group and a 2-pyridylthio group.

Examples of the alkyl- or aryl-sulfonyl group include a methanesulfonyl group and a phenylsulfonyl group. Examples of the alkyl- or aryl-sulfonyl group include a methanesulfonyl group and a phenylsulfonyl group.

The sulfamoyl group includes a sulfamoyl group having a substituent and an unsubstituted sulfamoyl group. Examples of the substituent include an alkyl group. Examples of the sulfamoyl group include a dimethylsulfamoyl group and a di-(2-hydroxyethyl)sulfamoyl group.

The azo dye particularly preferred in the present invention is represented by formula (2). In the formula, $Z^1$ represents an electron-withdrawing group having a Hammett's substituent constant σp value of 0.20 or more. $Z^1$ is preferably an electron-withdrawing group having a σp value of 0.30 to 1.0. Specific preferred examples of this substituent include electron-withdrawing substituents described later. Among those, preferred are an acyl group having a carbon number of 2 to 12, an alkyloxycarbonyl group having a carbon number of 2 to 12, a nitro group, a cyano group, an alkylsulfonyl group having a carbon number of 1 to 12, an arylsulfonyl group having a carbon number of 6 to 18, a carbamoyl group having a carbon number of 1 to 12 and a halogenated alkyl group having a carbon number of 1 to 12, more preferred are a cyano group, an alkylsulfonyl group having a carbon number of 1 to 12 and an arylsulfonyl group having a carbon number of 6 to 18, and most preferred is a cyano group.

$R^1$, $R^2$, $R^5$ and $R^6$ have the same meanings as in formula (1). $R^3$ and $R^4$ each independently represents a hydrogen atom, an aliphatic group, an aromatic group, a heterocyclic group, an acyl group, an alkoxycarbonyl group, an aryloxycarbonyl group, a carbamoyl group, an alkyl- or aryl-sulfonyl group or a sulfamoyl group, preferably a hydrogen atom, an aromatic group, a heterocyclic group, an acyl group or an alkyl- or aryl-sulfonyl group, more preferably a hydrogen atom, an aromatic group or a heterocyclic group. $Z^2$ represents a hydrogen atom, an aliphatic group, an aromatic group or a heterocyclic group.

Q represents a hydrogen atom, an aliphatic group, an aromatic group or a heterocyclic group. Q is preferably a group comprising a nonmetallic atom group necessary for forming a 5-, 6-, 7- or 8-membered ring. The 5-, 6-, 7- or 8-membered ring may be substituted, may be a saturated ring or may have an unsaturated bond. Q is more preferably an aromatic group or a heterocyclic group. Preferred examples of the nonmetallic atom include a nitrogen atom, an oxygen atom, a sulfur atom and a carbon atom. Specific examples of the 5-, 6-, 7- or 8-membered ring include a benzene ring, a cyclopentane ring, a cyclohexane ring, a cycloheptane ring, a cyclooctane ring, a cyclohexene ring, a pyridine ring, a pyrimidine ring, a pyrazine ring, a pyridazine ring, a triazine ring, an imidazole ring, a benzimidazole ring, an oxazole ring, a benzoxazole ring, a thiazole ring, a benzothiazole ring, an oxane ring, a sulfolane ring and a thiane ring.

The groups described in regard to formula (2) each may further has a substituent. In the case where these groups each further has a substituent, examples of the substituent include the substituents described in regard to formula (1), the groups described as examples for G, $R^1$ and $R^2$, and an ionic hydrophilic group.

Here, the Hammett's substituent constant σp value used in the present invention with regard to the substituent $Z^1$ is described. The Hammett's rule is an empirical rule advocated by L. P. Hammett in 1935 so as to quantitatively discuss the effect of a substituent on the reaction or equilibrium of a benzene derivative and its propriety is widely admitted at present. The substituent constant determined by the Hammett's rule includes a up value and a am value, and these values can be found in a large number of general publications and are described in detail, for example, in J. A. Dean (compiler), *Lange's Handbook of Chemistry,* 12th ed., McGraw-Hill (1979), and *Kagakuno Ryoiki* (*Chemistry Region*), special number, No. 122, pp. 96-103, Nankodo (1979). In the present invention, each substituent is limited or described by using the Hammett's substituent constant σp, but this does not mean that the substituent is limited only to those having a known value which can be found in the above-described publications. Needless to say, the substituent includes a substituent of which σp value is not known in publications but when measured based on the Hammett's rule, falls within the specified range. Furthermore, although formulae (1) and (2) of the present invention include those which are not a benzene derivative, the σp value is used as a measure for showing the electron effect of the substituent irrespective of the substitution site. In the present invention, the σp value is used in such a meaning.

Examples of the electron-withdrawing group having a Hammett's substituent constant σp value of 0.60 or more include a cyano group, a nitro group, an alkylsulfonyl group (e.g., methanesulfonyl) and an arylsulfonyl group (e.g., benzenesulfonyl). Examples of the electron-withdrawing group having a Hammett's σp value of 0.45 or more include, in addition to those described above, an acyl group (e.g., acetyl), an alkoxycarbonyl group (e.g., dodecyloxycarbonyl), an aryloxycarbonyl group (e.g., m-chlorophenoxycarbonyl), an alkylsulfinyl group (e.g., n-propylsulfinyl), an arylsulfinyl group (e.g., phenylsulfinyl), a sulfamoyl group (e.g., N-ethylsulfamoyl, N,N-dimethylsulfamoyl) and a halogenated alkyl group (e.g., trifluoromethyl).

Examples of the electron-withdrawing group having a Hammett's substituent constant σp value of 0.30 or more include, in addition to those described above, an acyloxy group (e.g., acetoxy), a carbamoyl group (e.g., N-ethylcarbamoyl, N,N-dibutylcarbamoyl), a halogenated alkoxy group (e.g., trifluoromethyloxy), a halogenated aryloxy group (e.g., pentafluorophenyloxy), a sulfonyloxy group (e.g., methylsulfonyloxy), a halogenated alkylthio group (e.g., difluoromethylthio), an aryl group substituted by two or more electron-withdrawing groups having a σp value of 0.15 or more (e.g., 2,4-dinitrophenyl, pentachlorophenyl) and a heterocyclic ring (e.g., 2-benzoxazolyl, 2-benzothiazolyl, 1-phenyl-2-benzimidazolyl). Specific examples of the electron-withdrawing group having a σp value of 0.20 or more include, in addition to those described above, a halogen atom.

The preferred combination of substituents in the azo dye represented by formula (1) is described below.

(i) $R^5$ and $R^6$ each is preferably a hydrogen atom, an alkyl group, an aryl group, a heterocyclic group, a sulfonyl group or an acyl group, more preferably a hydrogen atom, an aryl group, a heterocyclic group or a sulfonyl group, and most preferably a hydrogen atom, an aryl group or a heterocyclic group. However, $R^5$ and $R^6$ are not a hydrogen atom at the same time.

(ii) G is preferably a hydrogen atom, a halogen atom, an alkyl group, a hydroxyl group, an amino group or an amido group, more preferably a hydrogen atom, a halogen atom, an amino group or an amido group, and most preferably a hydrogen atom, an amino group or an amido group.

(iii) A is preferably a pyrazole ring, an imidazole ring, an isothiazole ring, a thiadiazole ring or a benzothiazole ring, more preferably a pyrazole ring or an isothiazole ring, and most preferably a pyrazole ring.

(iv) $B^1$ and $B^2$ each is preferably $-CR^1=$ or $-CR^2=$, and $R^1$ and $R^2$ each is preferably a hydrogen atom, a halogen atom, a cyano group, a carbamoyl group, a carboxyl group, an alkyl group, a hydroxy group or an alkoxy group, more preferably a hydrogen atom, a cyano group, a carbamoyl group or an alkyl group.

As for the preferred combination of substituents in the compound represented by formula (1), a compound where at least one of various substituents is the preferred group is preferred, a compound where a larger number of various substituents are the preferred groups is more preferred, and a compound where all substituents are the preferred groups is most preferred.

The compound represented by formula (1) may be produced by any method but, for example, can be produced by the following method.

(a) A compound represented by formula (3) shown below is reacted with a diazotizing agent to form a diazonium salt.

(b) The diazonium salt formed in the step (a) is reacted with a coupling agent represented by formula (4) shown below to form a compound represented by formula (1).

(c) The compound formed in the step (b) is reacted with an alkylating agent, an arylating agent or a heterylating agent in the presence of a base to form a compound represented by formula (1) in which a substituent such as alkyl group is introduced.

[Chem. 6]

Formula (3):

$A-NH_2$

Formula (4):

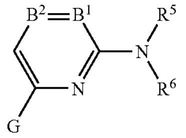

(wherein A, G, $B^1$, $B^2$, $R^5$ and $R^6$ have the same meanings as in formula (1).)

Furthermore, in the case of introducing a water-soluble group into the compound of formula (1), an electrophilic reaction is used. The electrophilic reaction includes sulfonation, Mannich reaction and Friedel-Crafts reaction and among these, sulfonation is preferred.

Specific examples of the compound represented by formula (1) which can be preferably used in the present invention are set forth below.

TABLE 1

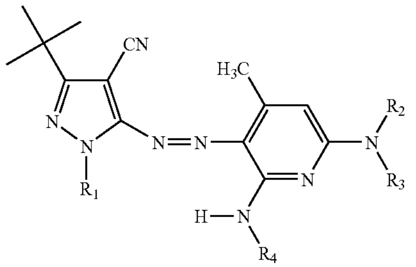

| Dye | $R_1$ | $R_2$ | $R_3$ |
|---|---|---|---|
| 1 | 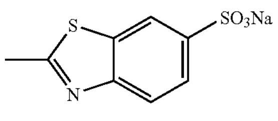 | 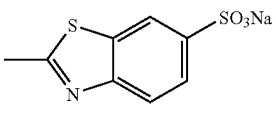 | 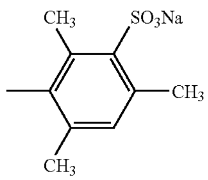 |
| 2 | 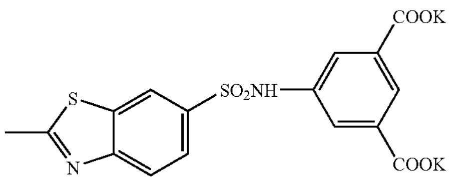 | 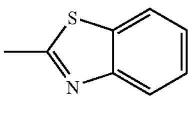 | 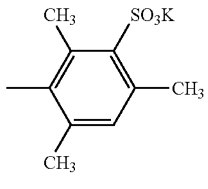 |

TABLE 1-continued
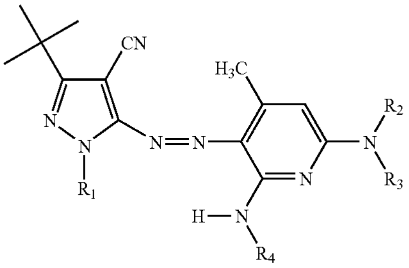
| | | | |
|---|---|---|---|
| 3 | 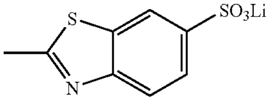 | 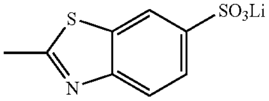 | 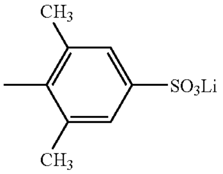 |
| 4 | 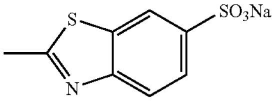 | 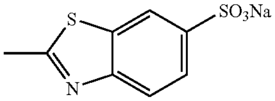 | 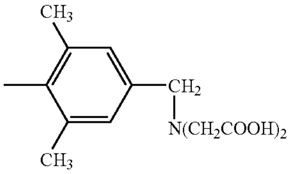 |
| Dye | $R_4$ |
|---|---|
| 1 | 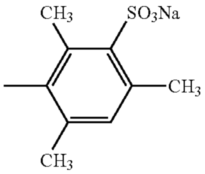 |
| 2 | 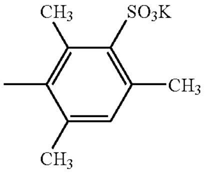 |
| 3 | 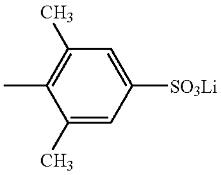 |
| 4 | 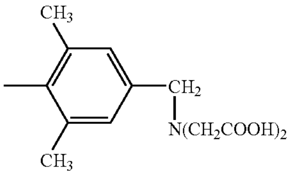 |

TABLE 2
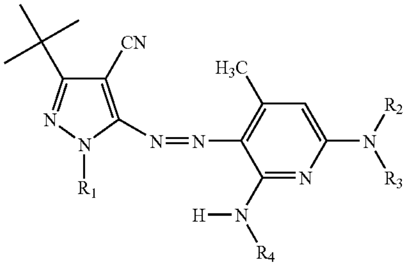
| Dye | $R_1$ | $R_2$ | $R_3$ | $R_4$ |
|---|---|---|---|---|
| 5 | 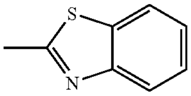 | 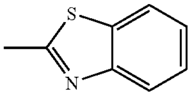 | 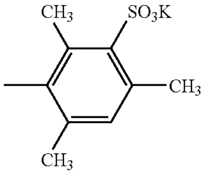 | 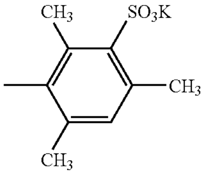 |
| 6 | 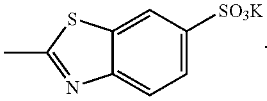 | 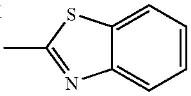 | 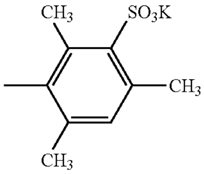 | 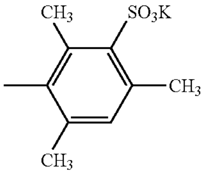 |
| 7 | 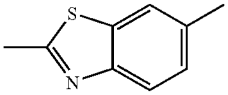 | 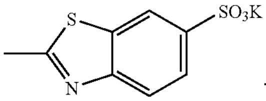 | 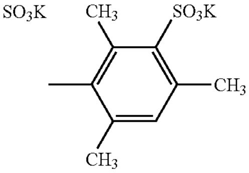 | 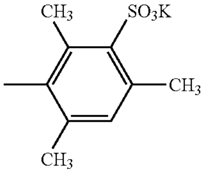 |
TABLE 3
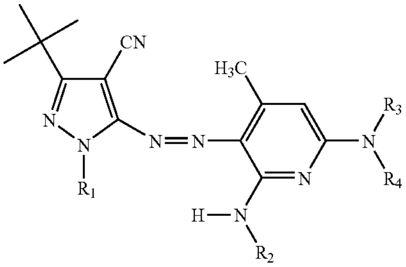
| Dye | $R_1$ | $R_2$ | $R_3$ | $R_4$ |
|---|---|---|---|---|
| 8 | 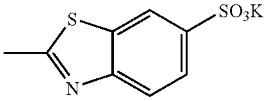 | 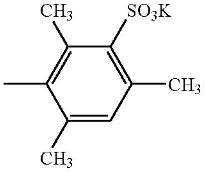 | 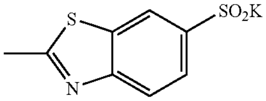 | 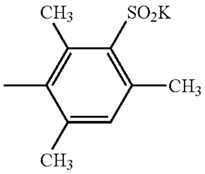 |
| 9 | 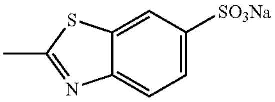 | 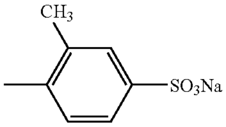 | 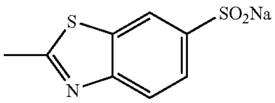 | 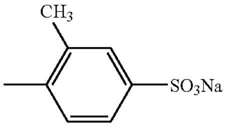 |

TABLE 3-continued
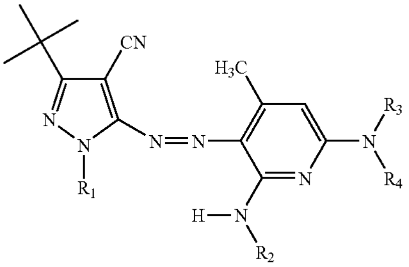
| Dye | R1 | R2 | R3 | R4 |
|---|---|---|---|---|
| 10 | 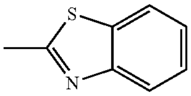 | 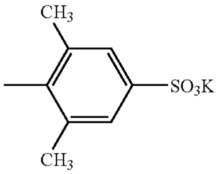 | 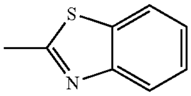 | 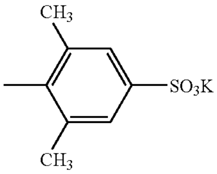 |
| 11 | 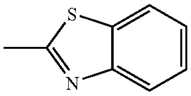 | 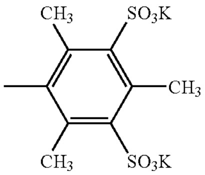 | 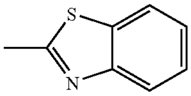 | 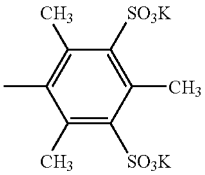 |
| 12 | 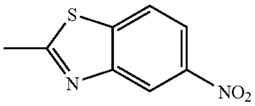 | 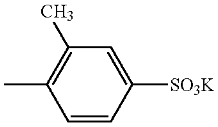 | 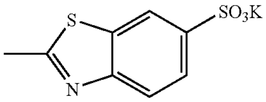 | 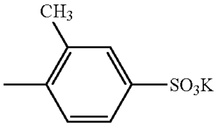 |
TABLE 4
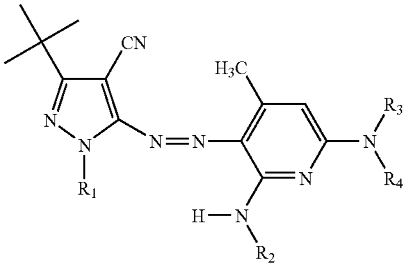
| Dye | R1 | R2 | R3 |
|---|---|---|---|
| 13 | 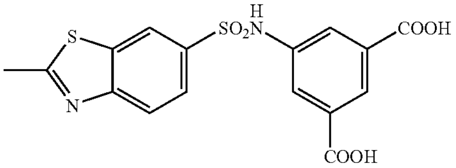 | 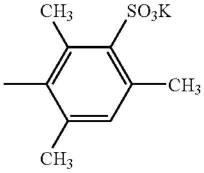 | 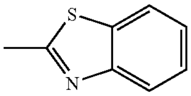 |
| 14 | 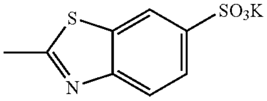 | 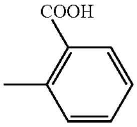 | 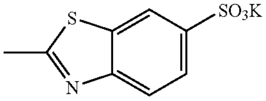 |

TABLE 4-continued
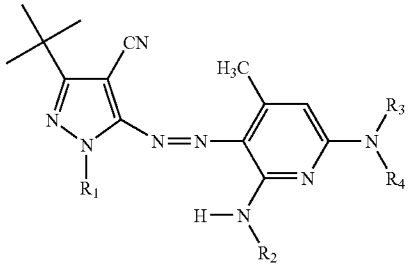
| | | | |
|---|---|---|---|
| 15 | 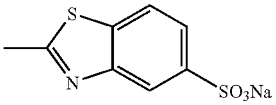 | 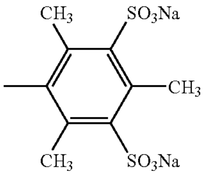 | 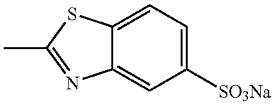 |
| 16 | 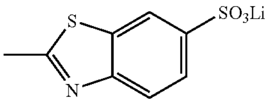 | 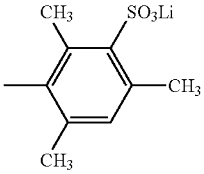 | 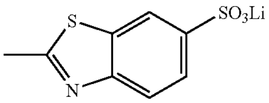 |
| 17 | 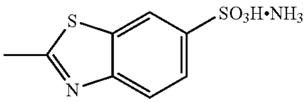 | 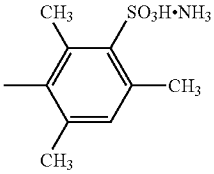 | 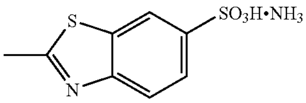 |
| Dye | $R_4$ |
|---|---|
| 13 | 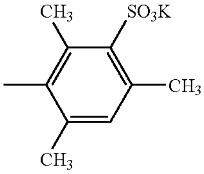 |
| 14 | 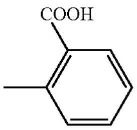 |
| 15 | 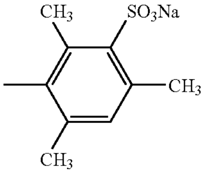 |
| 16 | 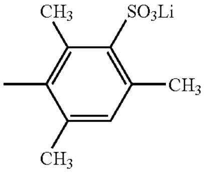 |

TABLE 4-continued
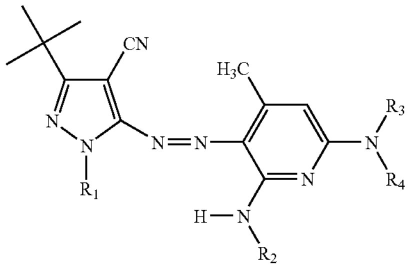
| | |
|---|---|
| 17 | 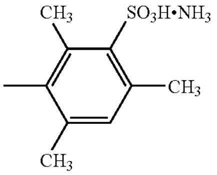 |
TABLE 5
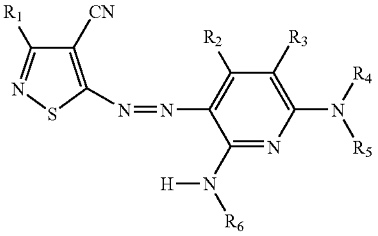
| Dye | $R_1$ | $R_2$ | $R_3$ | $R_4$ | $R_5$ | $R_6$ |
|---|---|---|---|---|---|---|
| b-1 | $CH_3$ | H | CN | H | 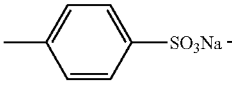 | 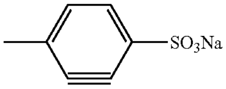 |
| b-2 | $CH_3$ | H | H | $SO_2CH_3$ | 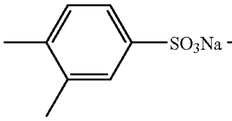 | 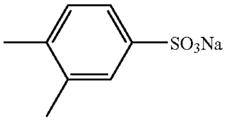 |
TABLE 6
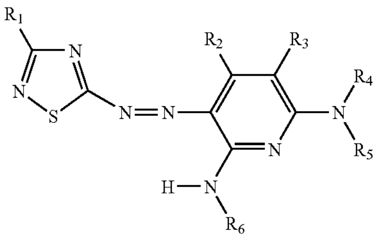
| Dye | $R_1$ | $R_2$ | $R_3$ | $R_4$ | $R_5$ | $R_6$ |
|---|---|---|---|---|---|---|
| c-1 | 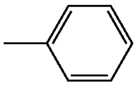 | H | $CONH_2$ | H | 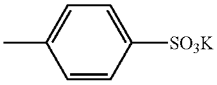 | 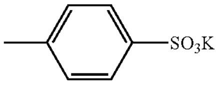 |

TABLE 6-continued

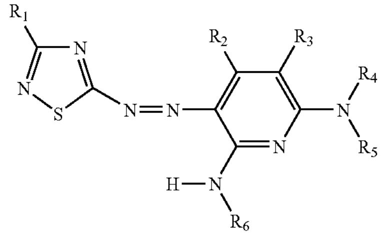

| Dye | $R_1$ | $R_2$ | $R_3$ | $R_4$ | $R_5$ | $R_6$ |
|---|---|---|---|---|---|---|
| c-2 | 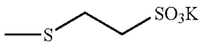 | $CH_3$ | H | 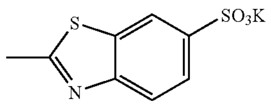 | 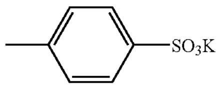 | 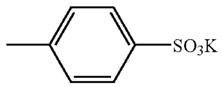 |

The content of the colorant is determined depending on, for example, the kind of each substituent in formula (1) or the kind of the solvent component, but is preferably from 0.1 to 10 wt %, more preferably from 0.5 to 5 wt %, based on the entire weight of the ink composition. When the content is 0.1 wt % or more, colorability and image density on a recording medium can be ensured, and when the content is 10 wt % or less, the viscosity of the ink composition can be easily adjusted and the properties such as ejection reliability and clogging resistance can be easily ensured.

In the ink composition, for adjusting the color tone, another magenta dye may be used in combination within the range of not greatly impairing the light fastness and the gas fastness. The magenta dye other than the compound represented by formula (1) is not particularly limited, but examples thereof include C.I. Direct Red 2, 4, 9, 23, 26, 31, 39, 62, 63, 72, 75, 76, 79, 80, 81, 83, 84, 89, 92, 95, 111, 173, 184, 207, 211, 212, 214, 218, 221, 223, 224, 225, 226, 227, 232, 233, 240, 241, 242, 243 and 247, C.I. Direct Violet 7, 9, 47, 48, 51, 66, 90, 93, 94, 95, 98, 100 and 101, C.I. Acid Red 35, 42, 52, 57, 62, 80, 82, 111, 114, 118, 119, 127, 128, 131, 143, 151, 154, 158, 249, 254, 257, 261, 263, 266, 289, 299, 301, 305, 336, 337, 361, 396 and 397, C.I. Acid Violet 5, 34, 43, 47, 48, 90, 103 and 126, C.I. Reactive Red 3, 13, 17, 19, 21, 22, 23, 24, 29, 35, 37, 40, 41, 43, 45, 49 and 55, C.I. Reactive Violet 1, 3, 4, 5, 6, 7, 8, 9, 16, 17, 22, 23, 24, 26, 27, 33 and 34, C.I. Basic Red 12, 13, 14, 15, 18, 22, 23, 24, 25, 27, 29, 35, 36, 38, 39, 45 and 46, and C.I. Basic Violet 1, 2, 3, 7, 10, 15, 16, 20, 21, 25, 27, 28, 35, 37, 39, 40 and 48.

In the present invention, as long as the ink composition comprises water, at least one member selected from the compounds represented by formula (1), and at least one member selected from an aromatic compound having a carboxyl group and a salt thereof, not only a magenta ink composition but also even an ink composition for a color different from magenta, such as black ink composition, can be enhanced in the light fastness, gas fastness and moisture resistance. For producing these various ink compositions, other conventionally known dyes may be used in combination therewith.

The ink composition of the present invention uses the above-descried colorant and for enhancing the moisture resistance, further contains at least one member selected from an aromatic compound having a carboxyl group and a salt thereof.

The aromatic compound having a carboxyl group or a salt thereof for use in the present invention may be any compound or salt as long as it is an aromatic compound having at least one carboxyl group within the molecular structure or a salt thereof, but an aromatic compound having one carboxyl group is preferred, and in terms of improving the moisture resistance, an aromatic compound having a naphthalene skeleton is preferred. An aromatic compound having a carboxyl group and an —OR group (R is a hydrogen atom or an alkyl group having a carbon number of 1 to 6) on the naphthalene skeleton is preferred, and the compound having a naphthalene skeleton or a salt thereof preferably contains one carboxyl group and one —OR group. Furthermore, a compound having a carboxyl group at its 2-position and having a naphthalene skeleton or a salt thereof is more preferred, and an alkali metal salt of a compound having a carboxyl group at its 2-position and having a naphthalene skeleton is more preferred. Among the alkali metal salts of a compound having a carboxyl group at its 2-position and having a naphthalene skeleton, a lithium salt is preferred in terms of clogging resistance.

Specific examples of the aromatic compound having a carboxyl group or a salt thereof include 2-hydroxy-1-naphthoic acid, 1-hydroxy-2-naphthoic acid, 1-naphthoic acid, 2-naphthoic acid, 3-hydroxy-2-naphthoic acid, 6-hydroxy-2-naphthoic acid, 3-methoxy-2-naphthoic acid, 6-methoxy-2-naphthoic acid, 6-ethoxy-2-naphthoic acid, 6-propoxy-2-naphthoic acid, 4-hydroxybenzoic acid, 2,6-naphthalenedicarboxylic acid, and a salt (particularly, lithium salt) thereof. Among these, 2-naphthoic acid, 3-hydroxy-2-naphthoic acid, 6-hydroxy-2-naphthoic acid, 6-methoxy-2-naphthoic acid and a salt (particularly, lithium salt) thereof are preferred.

The salt of the aromatic compound having a carboxyl group may be added in the form of a salt and incorporated into ink, or a free acid of the aromatic compound having a carboxyl group and a base may be added separately and incorporated into ink.

The content of at least one member selected from the aromatic compound having a carboxyl group and a salt thereof is determined according to, for example, the kind of the selected compound and/or a salt thereof, the kind of the colorant, or the kind of the solvent component but is preferably from 0.1 to 10 wt %, more preferably from 0.5 to 5 wt %, based on the entire weight of the ink composition. When the content is 0.1 wt % or more, the moisture resistance can be improved, and when the content is 10 wt % or less, the viscosity of the ink composition can be easily adjusted and the properties such as ejection reliability and clogging resistance can be easily ensured.

In the ink composition of the present invention, the content ratio of the compound represented by formula (1) and the at least one member selected from an aromatic compound having a carboxyl group and a salt thereof is preferably from 4:1 to 1:10, more preferably from 3:1 to 1:8, in terms of the weight ratio of respective total amounts. When the ratio of the at last one member selected from an aromatic compound having a carboxyl group and a salt thereof is 4:1 or more, an effect of improving the moisture resistance can be sufficiently obtained, and when the ratio is 1:10 or less, reliability in clogging and the like can be easily ensured.

In order to stably dissolve a predetermined amount of the colorant and a predetermined amount of the at least one member selected from an aromatic compound having a carboxyl group and a salt thereof, the pH (20° C.) of the ink composition is preferably 8.0 or more. Also, considering the material resistance against various members with which the ink composition comes into contact, the pH of the ink composition is preferably 10.5 or less. In order to more successfully attain both the stable dissolution and the material resistance, the pH of the ink composition is more preferably adjusted to from 8.5 to 10.0.

The ink composition of the present invention preferably uses, as the main solvent, water or a mixed solvent of water and a water-soluble organic solvent.

As for the water, ion exchanged water, ultra-filtered water, reverse osmosis water, distilled water or the like may be used. Also, from the aspect of long-term storage, water subjected to various chemical sterilization treatments such as ultraviolet irradiation or addition of hydrogen peroxide is preferred.

In the case of using water as the main solvent in the ink composition of the present invention, the content of the water is preferably from 40 to 90 wt %, more preferably from 50 to 80 wt %, based on the entire weight of the ink composition.

The ink composition of the present invention may further contain at least one humectant selected from saccharides and a water-soluble organic solvent having a vapor pressure smaller than that of pure water.

By virtue of containing a humectant, the evaporation of water can be suppressed and the ink can retain moisture in the inkjet recording system. Also, when the humectant is a water-soluble organic solvent, the ejection stability may be improved or the viscosity may be easily varied without causing any change in the ink properties.

The water-soluble organic solvent means a medium having a function of dissolving a solute and is selected from water-soluble organic solvents having a vapor pressure smaller than that of water. Specific preferred examples thereof include polyhydric alcohols such as ethylene glycol, propylene glycol, butanediol, pentanediol, 2-butene-1,4-diol, 2-methyl-2,4-pentanediol, glycerin, 1,2,6-hexanetriol, diethylene glycol, triethylene glycol and dipropylene glycol; ketones such as acetonylacetone; esters such as γ-butyrolactone and triethyl phosphate; a furfuryl alcohol, a tetrahydrofurfuryl alcohol and a thiodiglycol.

Preferred examples of the saccharides include maltitol, sorbitol, gluconolactone and maltose.

The humectant is preferably added in an amount of 5 to 50 wt %, more preferably from 5 to 30 wt %, still more preferably from 5 to 20 wt %, based on the entire amount of the ink composition. When the amount added thereof is 5 wt % or more, moisture retentivity can be obtained, and when it is 50 wt % or less, the viscosity can be easily adjusted to a viscosity for use in the inkjet recording.

The ink composition of the present invention preferably comprises a nitrogen-containing organic solvent as the solvent. Examples of the nitrogen-containing organic solvent include 1,3-dimethyl-2-imidazolidinone, 2-pyrrolidone, N-methyl-2-pyrrolidone and ϵ-caprolactam. Among these, 2-pyrrolidone is preferred. One of these solvents may be used alone, or two or more thereof may be used in combination.

The content of the nitrogen-containing organic solvent is preferably from 0.5 to 10 wt %, more preferably from 1 to 5 wt %. When the content of this solvent is 0.5 wt % or more, the solubility of the coloring material for use in the present invention can be improved by the addition, and when it is 10 wt % or less, the material resistance against various members with which the ink composition comes into contact is not worsened.

The ink composition of the present invention preferably contains a nonionic surfactant as an additive effective for obtaining swift fixing (penetrability) of the ink and maintaining the circularity of one dot.

Examples of the nonionic surfactant for use in the present invention include an acetylene glycol-based surfactant. Specific examples of the acetylene glycol-based surfactant include Surfynol 465, Surfynol 104 (trade names, both are produced by Air Products and Chemicals, Inc.), and Olfine STG (trade names, produced by Nisshin Chemical Industry Co.). The amount of the nonionic surfactant added is preferably from 0.1 to 5 wt %, more preferably from 0.5 to 2 wt %. When the amount added thereof is 0.1 wt % or more, sufficiently high penetrability can be obtained, and when it is 5 wt % or less, generation of image blurring can be easily prevented.

In addition to the nonionic surfactant, by adding glycol ethers as a penetration accelerator, penetrability is more enhanced and on performing color printing, bleeding at the boundary between adjacent color inks is reduced and a very sharp image can be obtained.

Examples of the glycol ethers which can be used in the present invention include ethylene glycol monobutyl ether, diethylene glycol monobutyl ether, triethylene glycol monoethyl ether, propylene glycol monomethyl ether, dipropylene glycol monoethyl ether, propylene glycol monobutyl ether, dipropylene glycol monobutyl ether and triethylene glycol monobutyl ether. The amount added thereof is preferably from 3 to 30 wt %, more preferably from 5 to 15 wt %. When the amount added is 3 wt % or more, a sufficiently high effect of preventing bleeding can be obtained, and when it is 30 wt % or less, the image blurring can be prevented with ease and the storage stability of the ink can be easily ensured.

Furthermore, a pH adjusting agent such as triethanolamine and alkali metal hydroxide, a hydrotropy agent such as urea and derivatives thereof, a water-soluble polymer such as sodium alginate, a water-soluble resin, a fluorine-containing surfactant, an antiseptic, an antifungal agent, a rust inhibitor and the like may be added to the ink composition of the present invention, as needed.

Examples of the antiseptic and antifungal include sodium benzoate, sodium pentachlorophenol, sodium 2-pyridinethiol-1-oxide, sodium sorbate, sodium dehydroacetate and 1,2-dibenzisothiazolin-3-one (Proxel CRL, Proxel BDN, Proxel GXL, Proxel XL-2 and Proxel TN produced by AVECIA).

Furthermore, examples of the pH adjusting agent, dissolution aid and antioxidant include amines such as diethanolamine, triethanolamine, propanolamine and morpholine, a modified product thereof, a metal hydroxide such as potassium hydroxide, sodium hydroxide and lithium hydroxide, ammonium salts such as ammonium hydroxide and quaternary ammonium hydroxide (e.g. tetramethylammonium), carbonates such as potassium carbonate, sodium carbonate and lithium carbonate, phosphates, pyrrolidones such as N-methyl-2-pyrrolidone and 2-pyrrolidone, ureas such as urea, thiourea and tetramethylurea, allophanates such as allophanate and methylallophanate, biurets such as biuret, dimethylbiuret and tetramethylbiuret, and L-ascorbic acid and salts thereof.

In the ink composition of the present invention, one of these optional components may be used alone or a plurality of members selected from the same group or different groups may be used in combination.

In the ink composition of the present invention, the amounts of all components for the ink composition are preferably selected such that the viscosity of the ink composition is less than 10 mPa·s at 20° C.

The surface tension of the ink composition of the present invention at 20° C. is preferably 45 mN/m or less, more preferably from 25 to 45 mN/m.

The ink composition of the present invention may be prepared, for example, by a method of thoroughly mixing and dissolving respective components, filtering the resulting solution under pressure through a membrane filter having a pore diameter of 0.8 μm, and then performing a deaeration treatment with the use of a vacuum pump.

The recording method of the present invention using the above-described ink composition is described below. In the recording method of the present invention, an inkjet recording system of ejecting the ink composition in the form of liquid droplets from fine orifices, and attaching the liquid droplets onto a recording medium, thereby performing the recording, can be suitably used, but the recording method is of course usable also for applications such as general writing tool, recorder and pen plotter.

As for the inkjet recording system, any conventionally known system may be employed. Particularly, in a method of ejecting liquid droplets by using vibration of a piezoelectric element (a recording method using an inkjet head capable of forming an ink droplet by mechanical deformation of an electrostrictive element) or in a method using heat energy, excellent image recording can be performed.

EXAMPLES

The present invention is described in greater detail below by referring to Examples and Comparative Examples. Incidentally, the present invention is not limited to the materials, compositions and preparation methods described in the following Examples.

Examples 1 to 10 and Comparative Examples 1 to 6

Ink compositions of Examples 1 to 10 and Comparative Examples 1 to 6 each was prepared by mixing and dissolving respective components at a blending ratio shown in Table 7 and filtering the resulting solution under pressure through a membrane filter having a pore diameter of 1 μm. The structures of Dyes 5 and 7 are shown in Table 2 above, the structure of Dye 8 is shown in Table 3 above, and the structure of Dye 15 is shown in Table 4 above.

TABLE 7

| | | Example | | | | | | | | | | Comparative Example | | | | | |
|---|---|---|---|---|---|---|---|---|---|---|---|---|---|---|---|---|---|
| | | 1 | 2 | 3 | 4 | 5 | 6 | 7 | 8 | 9 | 10 | 1 | 2 | 3 | 4 | 5 | 6 |
| Colorant | Dye 8 | 3.50 | | | | 3.50 | | 3.50 | | 3.50 | | 3.50 | | | | | |
| | Dye 5 | | 3.50 | | | | 3.50 | | | | | | 3.50 | | | | |
| | Dye 7 | | | 3.50 | | | | | 3.50 | | | | | | | | |
| | Dye 15 | | | | 3.50 | | | | | | 3.50 | | | 3.50 | | | |
| | C.I. Direct Red 227 | | | | | | | | | | | | | | 3.00 | | |
| | C.I. Acid Red 249 | | | | | | | | | | | | | | | 3.00 | 3.00 |
| Additive | 4-Hydroxybenzoic acid | 4.00 | 4.00 | 4.00 | 4.00 | | | | | | | | | | | | |
| | 2-Hydroxy-1-naphthoic acid | | | | | 4.00 | 4.00 | | | | | | | | | | |
| | 2-Naphthoic acid | | | | | | | 3.00 | 3.00 | 3.00 | 3.00 | | | | | | 3.00 |
| | NaOH | | | | | | | 0.70 | 0.70 | | | | | | | | |
| | LiOH—$H_2O$ | 1.22 | 1.22 | 1.22 | 1.22 | 0.90 | 0.90 | | | 0.75 | 0.75 | | | | | | 0.75 |
| Other ink constituent elements | Glycerin | 9.0 | 9.0 | 9.0 | 9.0 | 9.0 | 9.0 | 9.0 | 9.0 | 8.0 | 8.0 | 10.0 | 10.0 | 10.0 | 10.0 | 10.0 | 9.0 |
| | Triethylene glycol monobutyl ether | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 | 10.0 |
| | Triethylene glycol | | | | | | | 1.2 | 1.2 | 1.2 | 1.2 | 1.0 | 1.0 | 1.0 | 1.5 | 1.5 | 1.7 |
| | 2-Pyrrolidone | 1.0 | 1.0 | 1.0 | 1.0 | 1.0 | 1.0 | 1.0 | 1.0 | 1.0 | 1.0 | 2.5 | 2.5 | 2.5 | 2.5 | 2.5 | 1.0 |
| | Triethanolamine | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 | 0.6 |
| | Olfine E1010(*1) | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 | 0.8 |
| | Proxel XL-2(*2) | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 | 0.3 |
| Adjusting water | Ultrapure water | bal. | bal. | bal. | bal. | bal. | bal. | bal. | bal. | bal. | bal. | bal. | bal. | bal. | bal. | bal. | bal. |

In the Table, the numerical value indicates wt %.
(*1)produced by Nisshin Chemical Industry Co.
(*2)produced by AVECIA.

The ink compositions above each was filled in a special cartridge (magenta chamber) for an inkjet printer EM930C (manufactured by Seiko Epson Corporation), and printing was performed on an inkjet special recording medium (Premium Glossy Photo Paper, produced by Seiko Epson Corporation). The printed matter was subjected to respective evaluations. The results obtained are shown in Table 8.

<Evaluation of Light Fastness>

Using the cartridge above, printing was performed by adjusting the print duty to give and OD (optical density) falling within the range from 0.9 to 1.1. The resulting printed matter was exposed for 11 days under the conditions of 24° C., a relative humidity of 60% RH and an illuminance of 70,000 lux by using a fluorescent lamp weather resistance tester STF-II (trade name, manufactured by Suga Test Instruments Co., Ltd.).

After the exposure, OD of each printed matter was measured by a reflection densitometer ("Spectrolino", trade name, manufactured by Gretag), and the residual optical density (ROD) was determined according to the following formula and evaluated according to the criteria shown below:

$$ROD(\%)=(D/D_0)\times 100$$

D: OD after exposure test $D_0$: OD before exposure test (provided that the measurement conditions were: filter: red, light source: D50 and viewing angle: 2°).

[Criteria]

Rating 1: ROD was 85% or more.

Rating 2: ROD was from 70% to less than 85%.

Rating 3: ROD was from 55% to less than 70%.

Rating 4: ROD was less than 55%.

<Evaluation of Gas Fastness (Ozone Fastness)>

Using the cartridge above, printing was performed by adjusting the print duty to give an OD (optical density) falling within the range from 0.9 to 1.1. The resulting printed matter was exposed for 24 days under the conditions of 24° C., a relative humidity of 60% RH and an ozone concentration of 10 ppm by using an ozone weather meter Model OMS-H (trade name, manufactured by Suga Test Instruments Co., Ltd.).

After the exposure, OD of each printed matter was measured by a reflection densitometer ("Spectrolino", trade name, manufactured by Gretag), and the residual optical density (ROD) was determined according to the following formula and evaluated according to the criteria shown below:

$$ROD(\%)=(D/D_0)\times 100$$

D: OD after exposure test $D_0$: OD before exposure test (provided that the measurement conditions were: filter: red, light source: D50 and viewing angle: 2°).

[Criteria]

Rating 1: ROD was 85% or more.

Rating 2: ROD was from 70% to less than 85%.

Rating 3: ROD was from 55% to less than 70%.

Rating 4: ROD was less than 55%.

<Evaluation of Moisture Resistance>

Using the cartridge above, a character and an outline character were printed under the ejection conditions of give a hitting amount of 1.5 to 2.2 mg per 1 inch-square. The resulting printed matter was dried for 24 hours at 25° C. and 40% RH and then left standing in an environment at 40° C. and 85% RH for 3 days, and bleeding of dye (filling of the outline character) was observed with an eye and evaluated according to the following criteria.

[Criteria]

Rating 1: Almost no bleeding of dye was observed.

Rating 2: Slight bleeding of dye and slight collapse of character outline were observed.

Rating 3: Bleeding of dye and collapse of character outline were observed.

Rating 4: Bleeding of dye, thickening of character and entire staining of outline character were observed.

Rating 5: Significant bleeding of dye was observed, and the character and the outline character were unreadable.

<Evaluation of Clogging Resistance>

Using the cartridge above, printing was continuously performed for 10 minutes and normal ejection from all nozzles was confirmed. Thereafter, the printer was left standing in an environment of 60° C. and 15% RH for 21 days. After the standing, a cleaning operation was repeated until the ejection from all nozzles became equal to the initial ejection, and the clogging resistance was evaluated according to the following criteria.

[Criteria]

Rating 1: Ejection equal to initial ejection was recovered when the power source was turned on or the cleaning operation was performed from 1 to 4 times.

Rating 2: Ejection equal to initial ejection was recovered when the cleaning operation was performed from 5 to 8 times.

Rating 3: Ejection equal to initial ejection was recovered when the cleaning operation was performed from 9 to 12 times.

Rating 4: Ejection was not recovered even when the cleaning operation was performed 13 times.

TABLE 8

| | Light Fastness | Gas Fastness | Moisture Resistance | Clogging Resistance |
|---|---|---|---|---|
| Example 1 | 1 | 2 | 3 | 1 |
| Example 2 | 1 | 2 | 3 | 1 |
| Example 3 | 1 | 2 | 3 | 1 |
| Example 4 | 1 | 2 | 3 | 1 |
| Example 5 | 1 | 2 | 3 | 1 |
| Example 6 | 1 | 2 | 3 | 1 |
| Example 7 | 1 | 2 | 2 | 2 |
| Example 8 | 1 | 2 | 2 | 2 |
| Example 9 | 1 | 2 | 2 | 1 |
| Example 10 | 1 | 2 | 2 | 1 |
| Comparative Example 1 | 1 | 2 | 4 | 1 |
| Comparative Example 2 | 1 | 2 | 4 | 1 |
| Comparative Example 3 | 1 | 2 | 4 | 1 |
| Comparative Example 4 | 4 | 4 | 1 | 2 |
| Comparative Example 5 | 4 | 4 | 4 | 2 |
| Comparative Example 6 | 4 | 4 | 4 | 2 |

In the case where a compound represented by formula (1) is used as the colorant but an aromatic compound having a carboxyl group or a salt thereof is not contained (Comparative Examples 1 to 3), the moisture resistance is poor. In the case where a compound represented by formula (1) or a salt thereof is not used as the colorant (Comparative Examples 4 to 6), the light fastness and gas fastness (ozone fastness) are poor.

The ink compositions of Examples 1 to 10 each exhibits good quality not lower than a certain level in all of the properties, but when a compound having a naphthalene skeleton and having a carboxyl group at its 2-position is used (Examples 7 to 10), the moisture resistance is higher as compared with the case where the aromatic compound having a carboxyl group has no naphthalene skeleton (Examples 1 to 4) or has a naphthalene skeleton but has the carboxyl group not at its 2-position (Examples 5 and 6). Also, when a lithium salt of the aromatic compound having a carboxyl group (Examples 9 and 10) is used, the clogging resistance is higher as compared with the case of using a sodium salt (Examples 7 and 8).

The invention claimed is:

1. An ink composition consisting essentially of at least water, at least one member selected from the group consisting of a compound represented by formula (1) shown below and a salt thereof, and at least one member selected from the group consisting of an aromatic compound having a carboxyl group and a salt thereof:

Formula (1):

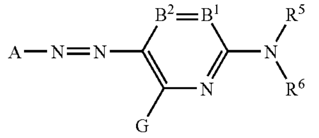

wherein A represents a residue of a 5-membered heterocyclic diazo component A-$NH_2$; $B^1$ and $B^2$ each represents —$CR^1$= or —$CR^2$=, or either one of $B^1$ and $B^2$ represents a nitrogen atom and the other represents —$CR^1$= or —$CR^2$=; $R^5$ and $R^6$ each independently represents a hydrogen atom, an aliphatic group, an aromatic group, a heterocyclic group, an acyl group, an alkoxycarbonyl group, an aryloxycarbonyl group, a carbamoyl group, an alkylsulfonyl group, an arylsulfonyl group or a sulfamoyl group, and each group may further have a substituent; G, $R^1$ and $R^2$ each independently represents a hydrogen atom, a halogen atom, an aliphatic group, an aromatic group, a heterocyclic group, a cyano group, a carboxyl group, a carbamoyl group, an alkoxycarbonyl group, an aryloxycarbonyl group, an acyl group, a hydroxy group, an alkoxy group, an aryloxy group, a silyloxy group, an acyloxy group, a carbamoyloxy group, a heterocyclic oxy group, an alkoxycarbonyloxy group, an aryloxycarbonyloxy group, an amino group substituted by an alkyl, aryl or heterocyclic group, an acylamino group, a ureido group, a sulfamoylamino group, an alkoxycarbonylamino group, an aryloxycarbonylamino group, an alkylsulfonylamino group, an arylsulfonylamino group, a nitro group, an alkylthio group, an arylthio group, an alkylsulfonyl group, an arylsulfonyl group, an alkyl-sulfinyl group, an arylsulfinyl group, a sulfamoyl group, a sulfo group or a heterocyclic thio group, and each group may be further substituted; and $R^1$ and $R^5$, or $R^5$ and $R^6$ may combine to form a 5- or 6-membered ring.

2. The ink composition as claimed in claim 1, wherein said compound represented by formula (1) or a salt thereof is a compound represented by the following formula (2) or a salt thereof:

Formula (2):

[Chem. 2]

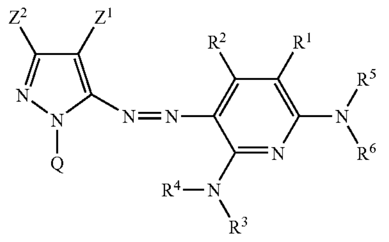

wherein $Z^1$ represents an electron-withdrawing group having a Hammett's substituent constant σp value of 0.20 or more; $Z^2$ represents a hydrogen atom, an aliphatic group, an aromatic group or a heterocyclic group; $R^1$, $R^2$, $R^5$ and $R^6$ have the same meanings as in formula (1); $R^3$ and $R^4$ each independently represents a hydrogen atom, an aliphatic group, an aromatic group, a heterocyclic group, an acyl group, an alkoxycarbonyl group, an aryloxycarbonyl group, a carbamoyl group, a sulfonyl group or a sulfamoyl group; Q represents a hydrogen atom, an aliphatic group, an aromatic group or a heterocyclic group; and the groups represented by $Z^1$, $Z^2$, $R^1$ to $R^6$ and Q may each further have a substituent.

3. The ink composition as claimed in claim 1, wherein the content ratio of said at least one member selected from a compound represented by formula (1) and a salt thereof and said at least one member selected from an aromatic compound having a carboxyl group and a salt thereof is from 4:1 to 1:10 in terms of weight ratio of respective total amounts.

4. The ink composition as claimed in claim 1, wherein said aromatic compound having a carboxyl group or a salt thereof is a compound having a naphthalene skeleton or a salt thereof.

5. The ink composition as claimed in claim 4, wherein said compound having a naphthalene skeleton or a salt thereof is a compound having a carboxyl group at its 2-position or a salt thereof.

6. The ink composition as claimed in claim 5, wherein said compound having a carboxyl group at its 2-position and having a naphthalene skeleton or a salt thereof is a 2-naphthoic acid, a 3-hydroxy-2-naphthoic acid, a 6-hydroxy-2-naphthoic acid, a 6-methoxy-2-naphthoic acid, or a salt thereof.

7. The ink composition as claimed in claim 4, wherein said salt of the aromatic compound having a carboxyl group is a lithium salt.

8. An inkjet recording method comprising ejecting a liquid droplet of the ink composition according to claim 1, and attaching said liquid droplet onto a recording medium, thereby performing recording.

9. Recorded matter which is recorded with the ink composition claimed claim 1.

10. Recorded matter which is by the recording method claimed in claim 8.

* * * * *